US009864255B2

(12) United States Patent
Abraham et al.

(10) Patent No.: US 9,864,255 B2
(45) Date of Patent: Jan. 9, 2018

(54) WAVEGUIDE FOR AN ELECTRO-OPTIC CAPACITIVE MODULATOR

(71) Applicants: COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITÉ PARIS-SUD, Orsay (FR)

(72) Inventors: Alexis Abraham, Echirolles (FR); Ségolène Olivier, Saint Martin le Vinoux (FR); Diego Perez-Galacho, Arcueil (FR); Delphine Marris-Morini, Montrouge (FR); Laurent Vivien, Vauhallan (FR)

(73) Assignees: COMMISSARIAT À L'ENERGIE ATOMIQUE ET AUX ENERGIES ALTERNATIVES, Paris (FR); CENTRE NATIONAL DE LA RECHERCHE SCIENTIFIQUE, Paris (FR); UNIVERSITÉ PARIS-SUD, Orsay (FR)

( * ) Notice: Subject to any disclaimer, the term of this patent is extended or adjusted under 35 U.S.C. 154(b) by 0 days.

(21) Appl. No.: 15/096,840

(22) Filed: Apr. 12, 2016

(65) Prior Publication Data
US 2016/0299402 A1 Oct. 13, 2016

(30) Foreign Application Priority Data
Apr. 13, 2015 (FR) ...................................... 15 53191

(51) Int. Cl.
G02F 1/225 (2006.01)
G02F 1/025 (2006.01)
G02F 1/015 (2006.01)

(52) U.S. Cl.
CPC ............ *G02F 1/2257* (2013.01); *G02F 1/025* (2013.01); *G02F 2001/0152* (2013.01); *G02F 2201/30* (2013.01); *G02F 2202/32* (2013.01)

(58) Field of Classification Search
CPC ... G02F 1/015; G02F 1/025; G02F 2001/0152
See application file for complete search history.

(56) References Cited

U.S. PATENT DOCUMENTS 6,947,616 B2 * 9/2005 Liu ........................ G02B 6/124
359/237
8,873,895 B2 * 10/2014 Fujikata .................. G02F 1/025
385/1

(Continued)

FOREIGN PATENT DOCUMENTS

EP 2463695 A1 6/2012
FR 1457748 A 1/1966

OTHER PUBLICATIONS

Layadi, Nace et al., "Plasma Etching in Microelectronics," American Vacuum Society, 2001, pp. 20-21.

*Primary Examiner* — Daniel Petkovsek
(74) *Attorney, Agent, or Firm* — Oliff PLC

(57) ABSTRACT

A waveguide including a substrate, an assembly of semiconductor regions consecutively extending on the substrate along a direction corresponding to a propagation direction of an electromagnetic wave having a wavelength noted $\lambda$, the semiconductor regions being electrically alternately doped with a first conductivity type and with a second conductivity type along the propagation direction, a dielectric layer interposed between two consecutive semiconductor regions, at least one pair of consecutive elementary structures having a dimensions along the propagation direction adapted to $\lambda$ to form a grating where the light propagates with no diffraction effects.

18 Claims, 3 Drawing Sheets

(56) References Cited

U.S. PATENT DOCUMENTS

| | | |
|---|---|---|
| 2003/0090286 A1 | 5/2003 | Samara-Rubio |
| 2005/0089257 A1 | 4/2005 | Barrios et al. |
| 2005/0189591 A1 | 9/2005 | Gothoskar et al. |
| 2011/0176762 A1 | 7/2011 | Fujikata et al. |
| 2015/0086149 A1 | 3/2015 | Zheng et al. |
| 2016/0041339 A1 | 2/2016 | Fedeli et al. |

* cited by examiner

WAVEGUIDE FOR AN ELECTRO-OPTIC CAPACITIVE MODULATOR

BACKGROUND

Technical Field

The present invention relates to a waveguide for a capacitive electro-optic modulator, as well as to a capacitive electro-optic modulator comprising such a waveguide.

The waveguide is intended to be coupled to at least one light source emitting an electromagnetic wave having a propagation direction, the electromagnetic wave having a wavelength noted $\lambda$. The coupling of the waveguide to the or each light source may be performed by various means such as passive components, active components, guides, optical fibers, etc.

RELATED ART

A waveguide for a known capacitive electro-optic modulator of the state of the art comprises:
- a substrate,
- two semiconductor regions extending on the substrate along a direction corresponding to a propagation direction of an electromagnetic wave, the two semiconductor regions being electrically doped with a first conductivity type and with a second conductivity type,
- a dielectric layer formed between the two semiconductor regions.

The two semiconductor regions form portions for guiding the electromagnetic wave. The two semiconductor regions are preferably crystalline, "Crystalline" means an area or a region where the atoms or molecules are arranged regularly according to a characteristic crystallographic pattern, which thus excludes amorphous regions. A crystalline region is thus advantageously made of a single-crystal or polycrystalline material. The two crystalline semiconductor regions are advantageously electrically doped to form a capacitance with the dielectric layer.

When the two semiconductor regions are submitted to a potential difference, the charge carriers accumulate at the interfaces between the dielectric layer and the semiconductor regions. Such a charge carrier concentration variation leads to an electro-refraction phenomenon, that is, the refractive index of the semiconductor layers locally varies according to the potential difference of the applied electric field. The optical field is essentially located in the dielectric layer and in the vicinity thereof, which provides a better overlapping between the optical field and the charge carrier concentration variation, thus increasing the efficiency of the electro-optic modulator. Such a variation of the refractive index of the semiconductor regions modifies the effective index of an optical mode propsgating within the waveguide, and enables to introduce a phase shift for an electromagnetic wave propagating through the semiconductor regions.

For electro-optic modulators, an interferometric structure is associated with the waveguide to obtain an intensity modulation based on the introduced phase shift. The interferometric structure may be an interferometer of Mach-Zehnder, Fabry-Perot type, or a resonant ring coupled to the waveguide.

Improving the performances of an electro-optic modulator comprises optimizing certain figures of merit, and particularly decreasing the value of product $V\pi L\pi$ to increase the modulation efficiency, where:

$V\pi$ is the voltage to be applied between the two semiconductor regions to introduce a $\pi$ phase-shift on the electromagnetic wave, $L\pi$ is the length of the guiding, portions for the associated voltage $V\pi$.

As an example, for a length $L\pi$ of 1 cm and an electro-optic modulator having a product $V\pi L\pi$ of 1 V.cm, it is necessary to apply 1 V to obtain a $\pi$ phase shift of the electromagnetic wave. As compared with the state of the art of silicon electro-optic modulators, the performances of an electro-optic modulator in terms of modulation efficiency may be deemed highly satisfactory when $V\pi L\pi < 1$ V.cm.

SUMMARY

The present invention aims at increasing the modulation efficiency of a capacitive electro-optic modulator, and concerns for this purpose a waveguide for a capacitive electro-optic modulator, the waveguide being intended to be coupled to at least one light source emitting an electromagnetic wave along a propagation direction, the electromagnetic wave having a wavelength noted $\lambda$, the waveguide comprising:
- a substrate;
- an assembly of semiconductor regions consecutively extending on the substrate along the propagation direction of the electromagnetic wave, the semiconductor regions being electrically alternately doped with a first conductivity type and with a second conductivity type along the propagation direction;
- an assembly of dielectric layers, each dielectric layer being formed between two consecutive semiconductor regions;
- the assembly of semiconductor regions and the assembly of dielectric layers forming a grating of elementary structures consecutively comprising a first elementary structure formed by a semiconductor region of the first conductivity type and an adjacent dielectric layer and a second elementary structure formed by a semiconductor region of the second conductivity type and an adjacent dielectric layer;
- the first and second elementary structures respectively having first and second dimensions $L_A$, $L_B$ along the propagation direction,
- a medium surrounding the grating, the medium exhibiting a light line; the first dimensions $L_A$ and the second dimensions $L_B$ of the elementary structures being adapted to $\lambda$ so that the grating authorizes optical modes propagating along the propagation direction, and so that the optical modes authorized by the grating are located under the light line.

Such a grating of elementary structures authorizes a propagation of the electromagnetic wave with no diffraction effect, and this despite the presence of a plurality of interfaces between a semiconductor region and a dielectric layer within the waveguide. The light line of the medium surrounding the grating is a line in a space $(\Phi, k_p)$, where w is the pulse of the electromagnetic wave in vacuum and is the wave vector tangential to the interface between the grating and the medium. The light line verifies equation $$\omega = \frac{k_{ii} c}{n_{env}}$$

where c is the speed of light in vacuum, and $n_{env}$ is the real part of the effective index of the medium. The light line delimits a light cone, above the light line, where the optical modes of the grating may couple to the medium. The fact for the optical modes authorized by the grating to be under the light line thus enables to obtain a propagation with no diffraction effect.

Thus, the overlapping between the charge carrier concentration variation areas and the optical propagation mode is increased with respect to the state of the art due to the grating of elementary structures. In other words, a larger fraction of the optical field interacts with the charge carrier concentration variation areas, which enables to increase the modulation efficiency.

The semiconductor regions and the dielectric layers of each elementary structure form portions for guiding the electromagnetic wave. The elementary structures form capacitances. "Propagation direction" is used to designate a direction which may in particular be rectilinear for a straight guide, or curvilinear for a curved guide. The electromagnetic wave is advantageously a monochromatic or quasi monochromatic wave. The semiconductor regions are advantageously crystalline. "Crystalline" means an area or a region where the atoms or molecules are arranged regularly according to a characteristic pattern, which thus excludes amorphous regions. A crystalline region is advantageously made of a single-crystal or polycrystalline material.

In an embodiment, the grating comprises photonic bandgaps defined for $$\Lambda_{B1} = \frac{m\lambda}{2n_{\text{eff}}},$$

where:
$\Lambda_{B1}$ is a spatial period of the grating,
m is a non-zero natural integer,
$n_{\text{eff}}$ is a real part of an effective index of an optical mode propagating along the propagation direction;
and the elementary structures form periodic patterns having a spatial period $\Lambda_p$ adapted so that the optical modes authorized by the grating are outside of the photonic bandgaps.

Thus, such a spatial period $\Lambda_p$ of the grating provides optical modes propagating along the propagation direction, and enables to avoid obtaining evanescent optical modes.

Further, the fact for the elementary structures to form periodic patterns enables to ease the manufacturing of such a waveguide.

According to an execution mode, the elementary structures form p-periodic patterns verifying:

$$L_{i+p} = L_i; \text{ and } \Lambda_p = \sum_{j=0}^{p-1} L_{i+j}$$

where $L_i$ is a dimension of an i-th elementary structure along the propagation direction.

According to an execution mode, the elementary structures form bi-periodic patterns verifying $L_{i+2}=L_i$; and $\Lambda_2=L_A+L_B$.

Advantageously, spatial period $\Lambda_2$ verifies $\Lambda_2 \leq \lambda/n_{\text{eff}}$.

Thus, such a condition provides optical modes outside of the photonic bandgaps with a security margin to compensate for unavoidable geometric inaccuracies on manufacturing of such a waveguide.

In an embodiment, the medium has a real part $n_{env}$ of an effective index, the electromagnetic wave propagating in vacuum has a wave number $k_0$, and the optical modes authorized by the grating have a wave number k verifying $k_0/k < 1/n_{env}$.

Thus, such optical modes authorized by the grating are located under the light line, which thus enables to obtain a propagation with no diffraction effect.

In the absence of light propagation within the medium, and by considering a homogeneous medium, the effective index of the medium means the optical index of the medium.

In an embodiment, each dielectric layer has:
a relative permittivity, noted $\epsilon_r$, and
a length, noted $l_0$, along the propagation direction, and $l_0$ and $\epsilon_r$ verify relation $$\frac{\epsilon_r}{l_o} \geq C_s/\epsilon_0,$$

where $C_s$ is a predetermined value representative of a surface capacitance, and $\epsilon_0$ is the permittivity of vacuum.

To increase the efficiency of the electro-optic modulator, it will be desired to maximize the surface capacitance of the waveguide, and thus to maximize ratio $\epsilon_r/l_0$.

According to an execution mode, the length along the propagation direction of the dielectric layer of each elementary structure verifies relation 5 nm $\leq l_0 \leq$ 50 nm, preferably 5 nm $\leq l_0 \leq$ 30 nm, more preferably 5 nm $\leq l_0 \leq$ 15 nm.

Thus, such lengths enable to obtain satisfactory performances of the electro-optic modulator for a given $\epsilon_r$, in particular when $\epsilon_r > 3$.

According to an execution mode, the dielectric layer of each elementary structure has:
a thickness, noted $e_0$, and
a length, noted $l_0$, along the propagation direction, and verifying relation 6 $\leq e_0/l_0 \leq$ 60, preferably 10 $\leq e_0/l_0 \leq$ 60, more preferably 20 $\leq e_0/l_0 \leq$ 60.

"Thickness" means a dimension along an axis perpendicular to a planar support surface of the substrate.

Thus, a waveguide with a plurality of vertical slots is obtained, the dielectric layers forming the slots. Such thickness-to-length ratios of the dielectric layer allow a better efficiency, and thus a more compact waveguide, and thereby a decrease in optical losses, while keeping a bandwidth acceptable for various applications.

According to an execution mode, the dielectric layer of each elementary structure is based on a material selected from the group comprising $SiO_2$, $Si_3N_4$, $HfO_2$.

Thus, $HfO_2$ is particularly advantageous due to its high $\epsilon_r$ ($\epsilon_r=25$) with respect to the other oxide-type materials. For $SiO_2$, $\epsilon_r=3.9$; for $Si_3N_4$, $\epsilon_r=7.5$. Ratio $\epsilon_r/l_0$ is thus larger with $HfO_2$, and the performances of the electro-optic modulator are increased for a same dielectric layer length.

Advantageously, the semiconductor regions are monocrystalline, preferably based on single-crystal silicon.

Thus, the optical losses are decreased with respect to polycrystalline semiconductor regions, for example.

According to an execution mode, the semiconductor regions have a doping level of the first conductivity type and of the second conductivity type in the range from $10^{16}$ cm$^{-3}$ to $10^{19}$ cm$^{-3}$, preferably in the range from $5 \times 10^{16}$ cm$^{-3}$ to $5 \times 10^{16}$ cm$^{-3}$, more preferably in the range from $10^{17}$ cm$^{-3}$ to $10^{18}$ cm$^{-3}$.

Thus, such doping levels enable to provide satisfactory performances of the electro-optic modulator in terms of modulation efficiency. The doping level is adjusted according to the desired performances. The doping level is obtained by the introduction of impurities of acceptor or donor type according to whether the semiconductor region is p- or n-type doped.

In an embodiment, each semiconductor region has a cross-section transversal to the propagation direction, the cross-section comprising a base provided with a raised portion.

Thus, the semiconductor regions form a ribbed waveguide. The raised portion defines a shoulder which enables to improve the confinement of the propagation mode with respect to a rectangular waveguide.

In an embodiment, the electromagnetic wave propagation direction is curvilinear, and $L_A$ and $L_B$ are curvilinear abscissas calculated from a central area of the waveguide.

The present invention also relates to a capacitive electro-optic modulator comprising a waveguide according to the invention.

BRIEF DESCRIPTION OF THE DRAWINGS

The foregoing and other features and advantages will be discussed in detail in the following non-limiting description of different embodiments of the invention, in connection with the accompanying drawings, among which.

For the different embodiments, the same references will be used for identical elements or elements performing the same function, to simplify the description. The technical characteristics described hereafter for different embodiments are to be considered separately or in any technically possible combination.

DETAILED DESCRIPTION

Figure 1:
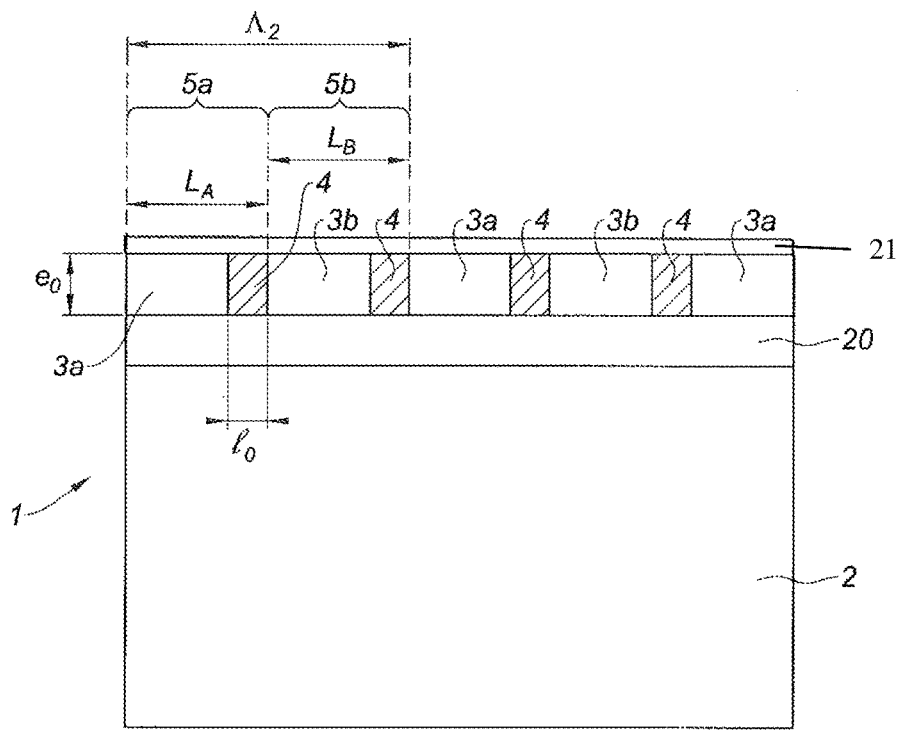
FIG. 1 is a simplified cross-section view of a waveguide according to the invention along the electromagnetic wave propagation direction.

FIG. 1 illustrates a waveguide 1 for a capacitive electro-optic modulator, waveguide 1 being intended to be coupled with at least one light source emitting an electromagnetic wave along a propagation direction X'-X, the electromagnetic wave having a wavelength noted λ, waveguide 1 comprising:
  a substrate 2,
  an assembly of semiconductor regions 3a, 3b consecutively extending on substrate 2 along propagation direction X'-X of the electromagnetic wave, semiconductor regions 3a, 3b being electrically alternately doped with a first conductivity type and with a second conductivity type along propagation direction X'-X,
  an assembly of dielectric layers 4, each dielectric layer 4 being formed between two consecutive semiconductor regions 3a, 3b, the assembly of semiconductor regions 3a, 3b and the assembly of dielectric layers 4 forming at least one grating of elementary structures 5a, 5b consecutively comprising:
  a first elementary structure 5a formed by a semiconductor region 3a of the first conductivity type and an adjacent dielectric layer 4, first elementary structure 5a having a first dimension, noted $L_A$, along propagation direction X'-X, and
  a second elementary structure 5b formed by a semiconductor region 3b of the second conductivity type and an adjacent dielectric layer 4, second elementary structure 5b having a second dimension, noted $L_B$, along propagation direction X'-X,
  a medium surrounding the grating, the medium having a light line,
  the first dimensions $L_A$ and the second dimensions $L_B$ of elementary structures 5a, 5b being adapted to λ so that the grating authorizes optical modes propagating along propagation direction X'-X, and so that the optical modes authorized by the grating are located under the light line.

Substrate 2 is advantageously of semiconductor-on-insulator type (SOI) with a buried oxide layer 20. Substrate 2 is advantageously based on silicon. The medium surrounding the grating preferably comprises a layer of a dielectric material, the dielectric material preferably being silicon dioxide. The medium comprises buried oxide layer 20 and layer 21 that together, surround the grating.

Semiconductor regions 3a, 3b are advantageously crystalline. "Crystalline" means an area or a region where the atoms or molecules are arranged regularly according to a characteristic crystallographic pattern, which thus excludes amorphous regions. Advantageously, semiconductor regions 3a, 3b are monocrystalline, preferably based on single-crystal silicon. Semiconductor regions 3a, 3b have a doping level of the first conductivity type and of the second conductivity type in the range from $10^{16}$ cm$^{-3}$ to $10^{19}$ cm$^{-3}$, preferably in the range from $5\times10^{16}$ cm$^{-3}$ to $5\times10^{18}$ cm$^{-3}$, more preferably in the range from $10^{17}$ cm$^{-3}$ to $10^{18}$ cm$^{-3}$. As an example, semiconductor regions 3a are p-type doped and semiconductor regions 3b are n-type doped.

The dielectric layer 4 of each elementary structure 5a, 5b preferably is an oxide. The dielectric layer 4 of each elementary structure 5a, 5b is advantageously based on a material selected from the group comprising $SiO_2$, $Si_3N_4$, $HfO_2$. The dielectric layer 4 of each elementary structure 5a, 5b has:
  a relative permittivity, noted $\in_r$,
  a thickness, noted $e_0$,
  a length, noted $l_0$, along propagation direction X'-X.

"Thickness" means a dimension along an axis perpendicular to a planar support surface of substrate 2.

Advantageously, $l_0$ and $\in_r$ verify relation $$\frac{\varepsilon_r}{l_o} \geq C_s/\varepsilon_0,$$

where $C_s$ is a predetermined value representative of a surface capacitance, and $\varepsilon_0$ is the permittivity of vacuum. As an example, satisfactory performances of the electro-optic modulator in terms of modulation efficiency have been observed from a surface capacitance $C_s$ greater than 2 fF/μm² when the dielectric layer 4 of each elementary structure 5a, 5b is based on SiO₂. Advantageously, $\in_0$ and $l_0$ verify relation $6 \leq e_0/l_0 \leq 60$, preferably $10 \leq e_0/l_0 \leq 60$, more preferably $20 \leq e_0/l_0 \leq 60$. Advantageously, $l_0$ verifies relation 5 nm $\leq l_0 \leq$ 50 nm, preferably 5 nm $\leq l_0 \leq$ 30 nm, more preferably 5 nm $\leq l_0 \leq$ 15 nm.

In an embodiment, the grating comprises photonic bandgaps defined for $$\Lambda_{BI} = \frac{m\lambda}{2n_{\it eff}},$$

where:

$\Lambda_{BI}$ is a spatial period of the grating, m is a non-zero natural integer, $n_{\it eff}$ is a real part of an effective index of an optical mode propagating along propagation direction X'-X.

Elementary structures 5a, 5b advantageously form periodic patterns having a spatial period $\Lambda_p$ adapted so that the optical modes authorized by the grating are outside of the photonic bandgaps. As an example, such optical modes may verify the following relation:

$$n_{\it eff}(\Lambda_p) \neq m\frac{\lambda}{2\Lambda_p} \pm 10^{-5},$$

Elementary structures 5a, 5b advantageously form p-periodic patterns verifying:

$$L_{i+p} = L_i; \text{ et } \Lambda_p = \sum_{j=0}^{p-1} L_{i+j}$$

where $L_i$ is a dimension of an i-th elementary structure 5a, 5b along propagation direction X'-X.

As illustrated in FIG. 1, elementary structures 5a, 5b form bi-periodic patterns verifying $L_{i+2}=L_i$; et $\Lambda_2=L_A+L_B$.

The medium has a real part $n_{\it env}$ of an effective index, and the electromagnetic wave propagating in vacuum has a wave number $k_0$, and the optical modes authorized by the grating have a wave number k verifying $k_0/k<1/n_{\it env}$.

According to an execution mode, each semiconductor region 3a, 3b has an identical length L along propagation direction X'-X. The dielectric layer 4 of each elementary structure 5a, 5b has an identical length to along propagation direction X'-X. As a result, $L_A=L_B=L+l_0$; et $\Lambda_2=2(L+l_0)$. Advantageously, spatial period $\Lambda_2$ verifies $\Lambda_2<\lambda/n_{\it eff}$.

Noting "P" (respectively "N") a p-type (respectively n-type) doped semiconductor region 3a, 3b and "O" each dielectric layer 4, the assembly of semiconductor regions 3a, 3b and of dielectric layers 4 of FIG. 1 can be written as PONOPONOP as a non-limiting example.

Each pair of consecutive elementary structures 5a, 5b can thus be written as PONO or NOPO. The assembly of elementary structures 5a, 5b forms the active portion of waveguide 1. Of course, the assembly of semiconductor regions 3a, 3b and of dielectric layers 4 may comprise a different number of elementary structures 5a, 5b. For example, for a constant modulation efficiency expressed by product Vπ Lπ, the increase of the number of elementary structures 5a, 5b, and thus of Lπ, enables to decrease the operating voltage of the electro-optic modulator.

Figure 4:
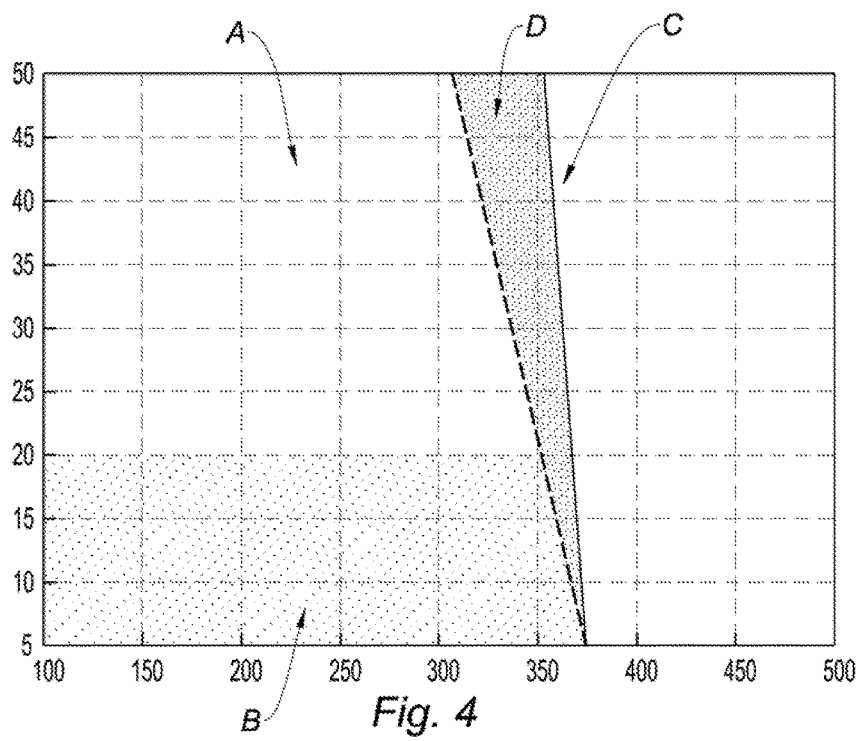
FIG. 4 is a graph showing in abscissas the length (in nm) of a semiconductor region of an elementary structure for a given longitudinal section of a guide according to the invention, and in ordinates (in nm) the dielectric layer of the elementary structure, the graph illustrating different propagation modes.

FIG. 4 illustrates a method of determining the length of a semiconductor region 3a, 3b of an elementary structure 5a, 5b from a given length $l_0$ of dielectric layer 4 to obtain an adapted grating. The method applies to the simplified case of a 1D structure similar to FIG. 1 where the formalism of such a structure is based on an analytic model, for example explained in document "An Introduction to optical Bloch modes" of P. Lalanne (2012).

For a given wavelength, for example, λ=1.55 μm, the refractive index of semiconductor regions 3a, 3b is assumed to be equal to effective index $n_{\it eff}$ of the optical mode propagating in semiconductor region 3a or semiconductor region 3b. This assumption enables to reduce a 3D problem to a 1D problem. The effective index of the optical mode propagating along propagation direction X'-X in semiconductor regions 3a, 3b is determined by a method known by those skilled in the art. For a length $l_0$ of dielectric layer 4 and a given length L of semiconductor region 3a, 3b, the resolution of the analytic model provides a relation of type $n_{\it eff}=f(\lambda,l_0,L)$.

FIG. 4 is a simulation result applying this method. Solving this equation provides an assembly of pairs (L, $l_0$) at a determined wavelength. FIG. 4 is an example of a chart that can be obtained according to L (axis of abscissas) and $l_0$ (axis of ordinates). This chart enables to define a plurality of propagation areas of the optical mode in the periodic structure.

Regions A and C correspond to a possible propagation mode where the assembly of elementary structures 5 forms a grating where optical modes propagating along propagation direction X'-X are authorized (Bloch modes).

Area D interposed between regions A and C corresponds to a photonic bandgap defined for $$\Lambda_{BI} = \frac{m\lambda}{2n_{\it eff}},$$

where:

$\Lambda_{BI}$ is a spatial period of the grating, m is a non-zero natural integer, $n_{\it eff}$ is a real part of an effective index of an optical mode propagating along propagation direction X'-X.

Figure 5:
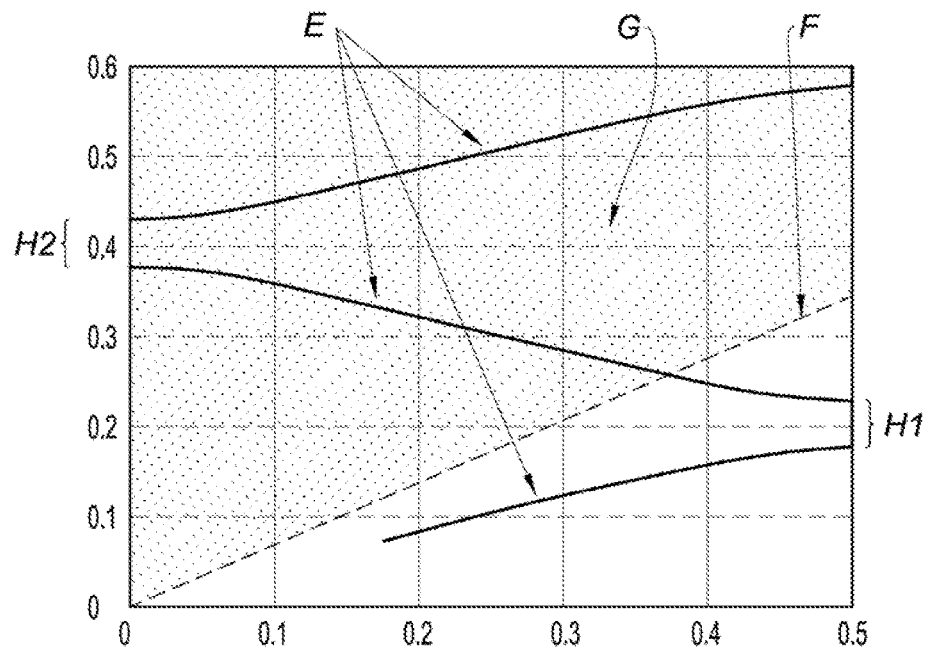
FIG. 5 is a graph showing in abscissas the wave vector k associated with a 1-periodic grating of elementary structures, and in ordinates the wave vector $k_0$ associated with the light propagating in vacuum.

Finally, regions A and C comprise an operating area B for values of $l_0$ enabling to achieve the desired performances of the electro-optic modulator. The maximum value of $l_0$ is previously determined according to relation $$\frac{\varepsilon_r}{l_o} \geq C_s/\varepsilon_0,$$

as indicated hereabove. In the case of more complex structures, 3D for example, relation $n_{\it eff}=f(\lambda,l_0,L)$ is determined by means of digital simulations known by those skilled in the art. FIG. 5 illustrates the second portion of the previous method, which comprises, for a determined length $l_0$, determining length L of a semiconductor region 3a, 3b of an elementary structure 5a, 5b necessary to obtain a grating where the light can propagate with no diffraction effect. FIG. 5 is a simulation result which enables to obtain the wave number k associated with the grating based on previously-discussed relation $n_{\it eff}=f(\lambda,l_0,L)$. FIG. 5 is an example of a chart that can be obtained according to k/K (axis of abscissas) and $k_0$/K (axis of ordinates) where $$K = \frac{2\pi}{L+l_0}.$$

This chart enables to define a plurality of areas of propagation of the optical mode in the grating, each of the points of the curve corresponding to a given pair ($l_0$, L). Areas H1 and H2 correspond to the photonic bandgaps (delimited by curves E) where the light does not propagate in the grating and where relation $$\Lambda_{BI} = \frac{m\lambda}{2n_{\mathit{eff}}}$$

is verified, where:

$\Lambda_{BI}$ is a spatial period of the grating, m is a non-zero natural integer, $n_{\mathit{eff}}$ is a real part of an effective index of an optical mode propagating along propagation direction X'-X.

Area H1 corresponds to m=1 and area H2 corresponds to m=2. Curve F plots relation $k_0=k/n_{env}$ (curve F is called light line) and enable to define the area G for which $k_0/k>1/n_{env}$ (area G is called light cone), that is, the area where the light propagates in the grating with diffraction effects. In such conditions, the values L which enable to obtain the propagation of light in the 1-periodic grating with no diffraction effect correspond to the pairs ($l_0$, L) associated with the values of curve A located under area C.

Figure 2:
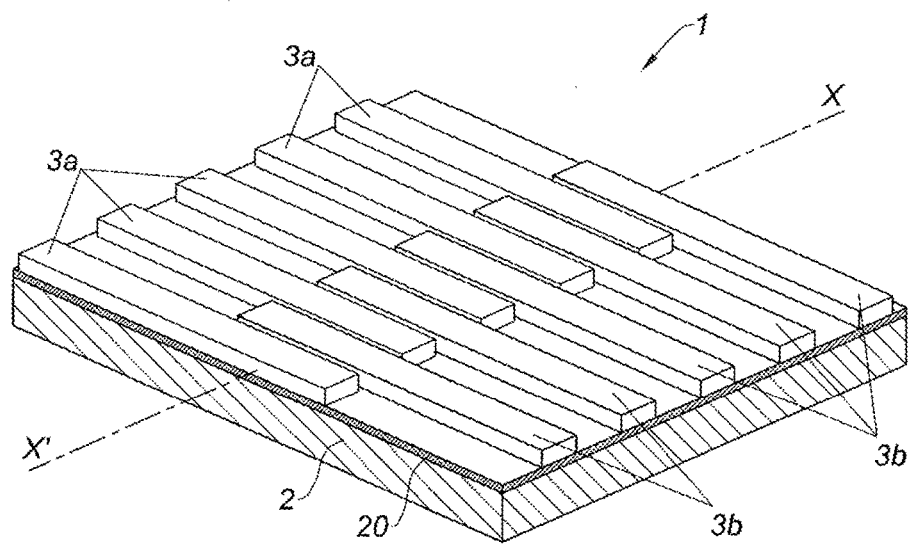
FIGS. 2 and 3 are simplified perspective views of two embodiments of a waveguide according to the invention, where the dielectric layer of each elementary structure is not shown.

In the embodiment illustrated in FIG. 2, each semiconductor region 3a, 3b has a cross-section transversal to propagation direction X'-X of rectangular shape. The waveguide 1 thus obtained is a rectangular waveguide.

Figure 3:
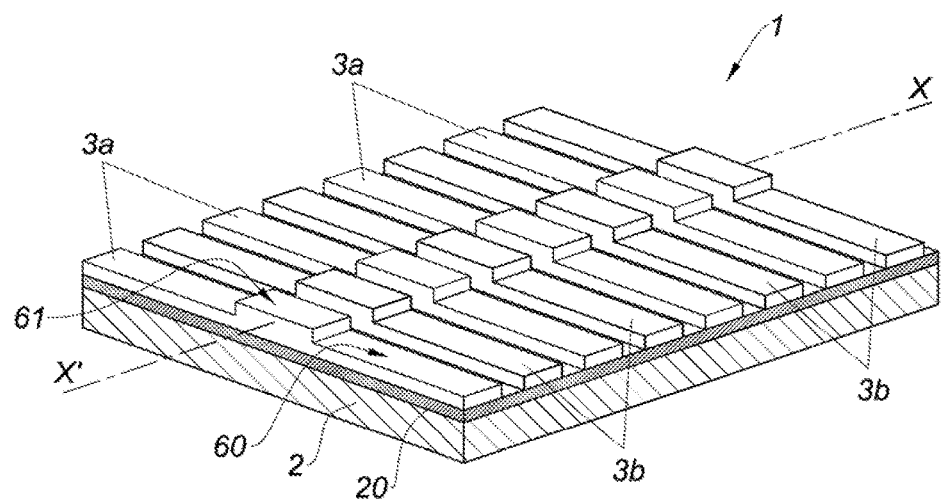

According to an alternative embodiment illustrated in FIG. 3, each semiconductor region 3a, 3b has a cross-section transversal to propagation direction X'-X, the cross-section comprising a base 60 provided with a raised portion 61. The waveguide 1 thus obtained is a ribbed waveguide.

Figure 6:
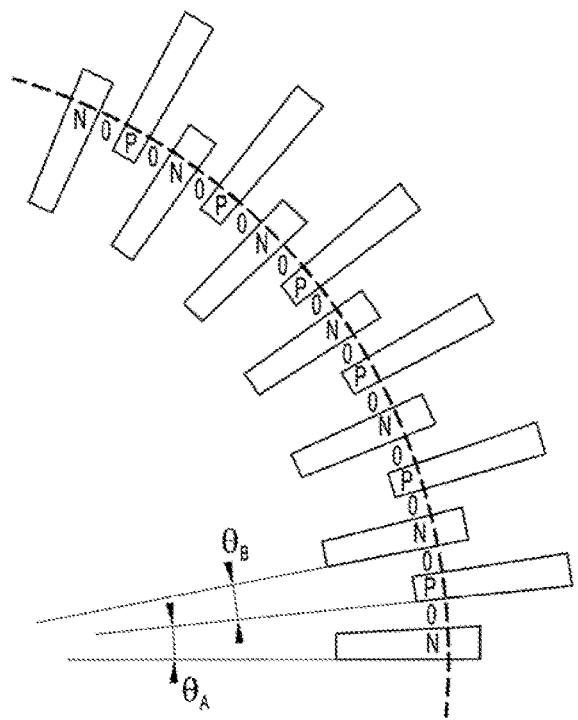
FIG. 6 is a simplified cross-section view of a waveguide according to the invention with a curvilinear propagation direction of the electromagnetic wave.

In the embodiment illustrated in FIG. 6, propagation direction X'-X of the electromagnetic wave is curvilinear, and $L_A$ and $L_B$ are curvilinear abscissas calculated from a central area of waveguide 1. As an example, in the case of a circular waveguide of radius R, curvilinear abscissas $L_A$ and $L_B$ are defined from angles $\theta_A$ and $\theta_B$, such that $L_A=R\,\theta_A$ and $L_B=R\,\theta_B$. Elementary structures 5a, 5b are radially defined.

A method of manufacturing a waveguide 1 according to the invention comprises the steps of:

a) providing a substrate 2 successively comprising an electric insulator layer 20 and a semiconductor layer, the semiconductor layer being preferably crystalline, b) forming a plurality of trenches in the semiconductor layer to expose electric insulator layer 20 and delimit an assembly of semiconductor regions 3a, 3b consecutively extending on substrate 2 along a propagation direction X'-X of an electromagnetic wave having a wavelength noted λ, c) forming a dielectric layer 4 between two consecutive semiconductor regions 3a, 3b, d) electrically doping the assembly of semiconductor regions 3a, 3b alternately according to a first conductivity type and to a second conductivity type along propagation direction X'-X.

The assembly of semiconductor regions 3a, 3b and of dielectric layers 4 form a grating of consecutive elementary structures 5a, 5b comprising:

a first elementary structure 5a formed by a semiconductor region 3a of the first conductivity type and an adjacent dielectric layer 4, first elementary structure 5a having a first dimension, noted $L_A$, along propagation direction X'-X, and a second elementary structure 5b formed by a semiconductor region 3b of the second conductivity type and an adjacent dielectric layer 4, second elementary structure 5b having a second dimension, noted $L_B$, along propagation direction X'-X.

The grating is surrounded with a medium having a light line. The medium comprises, in particular, electric insulator layer 20. The medium has a real part $n_{env}$ of an effective index. The electromagnetic wave propagating in vacuum has a wave number $k_0$.

The plurality of trenches formed at step b) is sized so that the first dimensions $L_A$ and the second dimensions $L_B$ of elementary structures 5a, 5b are adapted to λ so that the grating authorizes optical modes propagating along propagation direction X'-X and that the optical modes authorized by the grating are located under the light line. The optical modes authorized by the grating have a wave number k verifying $k_0/k<1/n_{env}$.

According to an embodiment, the grating comprises photonic bandgaps defined for $$\Lambda_{BI} = \frac{m\lambda}{2n_{\mathit{eff}}},$$

where:

$\Lambda_{BI}$ is a spatial period of the grating, m is a non-zero natural integer, $n_{\mathit{eff}}$ is a real part of an effective index of an optical mode propagating along propagation direction X'-X.

The plurality of trenches formed at step b) is sized so that elementary structures 5a, 5b form periodic patterns having a spatial period $\Lambda_p$ adapted so that the optical modes authorized by the grating are outside of the photonic bandgaps.

According to an embodiment, the plurality of trenches formed at step b) is sized so that elementary structures 5a, 5b form p-periodic patterns verifying:

$$L_{i+p} = L_i;\ \text{et}\ \Lambda_p = \sum_{j=0}^{p-1} L_{i+j}$$

where $L_i$ is a dimension of an i-th elementary structure 5a, 5b along propagation direction X'-X.

According to an embodiment, the plurality of trenches formed at step b) is sized so that elementary structures 5a, 5b form bi-periodic patterns verifying $L_{i+2}=L_i$; and $\Lambda_2=L_A+L_B$. Advantageously, spatial period $\Lambda_2$ verifies $\Lambda_2<\lambda/n_{\mathit{eff}}$.

Advantageously, the dielectric layer 4 of each elementary structure 5 formed at step c) has:

a relative permittivity, noted $\in_r$, and a length, noted $l_o$, along propagation direction X'-X, and the plurality of trenches formed at step b) is sized so that $l_0$ verifies relation $$\frac{\varepsilon_r}{l_o} \geq C_s/\varepsilon_0,$$

where $C_s$ is a predetermined value representative of a surface capacitance, and $\epsilon_0$ is the permittivity of vacuum.

The forming of a trench at step b) and the forming of a dielectric layer between two consecutive semiconductor regions may be executed similarly to the method described in document EP 2 463 695.

According to an embodiment, the dielectric layer 4 of each elementary structure 5 has:
a thickness, noted $e_0$, and
a length, noted $l_0$, along propagation direction X'-X, and verifying relation $6 \leq e_0/l_0 \leq 60$, preferably $10 \leq e_0/l_0 \leq 60$, more preferably $20 \leq e_0/l_0 \leq 60$.

For such a geometry of dielectric layer 4, each trench formed at step b) is advantageously configured so that a semiconductor area forms a seed layer extending across a thickness strictly smaller than the thickness of the semiconductor layer. "Seed layer" means a thin layer forming an epitaxial growth support for a crystalline material. A semiconductor region 3a, 3b is then formed by epitaxy from said semiconductor area forming the seed layer. The forming of such trenches at step b) may be obtained by an overetching, and is known as trenching, for example described in the work entitled "Plasma Etching in Microelectronics", N. Layadi et al., 2001. The forming of a trench at step b) may be executed similarly to the method described in document FR 14/57748. Step d) advantageously comprises the steps of:
d1) electrically doping according to the first conductivity type the semiconductor layer before step b),
d2) electrically doping according to the second conductivity type the semiconductor regions formed by epitaxy after step c).

The invention claimed is:

1. A waveguide for a capacitive electro-optic modulator, the waveguide defining a propagation direction for an electromagnetic wave, the waveguide comprising:
a substrate;
an assembly of semiconductor regions consecutively extending on the substrate along the propagation direction of the electromagnetic wave, the semiconductor regions being electrically alternately doped with a first conductivity type and with a second conductivity type along the propagation direction;
an assembly of dielectric layers, each dielectric layer being formed between two consecutive semiconductor regions; the assembly of semiconductor regions and the assembly of dielectric layers forming a grating of structures consecutively comprising a first structure formed by a semiconductor region of the first conductivity type and an adjacent dielectric layer, and a second structure formed by a semiconductor region of the second conductivity type and an adjacent dielectric layer; the first and second structures respectively having first and second dimensions $L_A$, $L_B$ along the propagation direction, the grating being configured to propagate optical modes of the electromagnetic wave having a wave number k in the grating;
a first layer in direct contact with the grating of first and second structures, the first layer being offset from the propagation direction of the electromagnetic wave, the first layer having a real part $n_{env}$ of an effective index such that the equation:
$k_0/k < 1/n_{env}$ is satisfied, where $k_0$ is a wave number of the electromagnetic wave propagating in vacuum.

2. The waveguide according to claim 1, wherein the grating comprises photonic bandgaps defined for $$\Lambda_{BI} = \frac{m\lambda}{2n_{eff}},$$

where:
$\Lambda_{BI}$ is a spatial period of the grating,
m is a non-zero natural integer,
$n_{eff}$ is a real part of an effective index of an optical mode propagating along the propagation direction,
$\lambda$ is a wavelength of the electromagnetic wave;
and wherein the first and second structures form periodic patterns having a spatial period $\Lambda_p$ $^{\Lambda_p}$ such that the optical modes allowed to propagate by the grating are outside of the photonic bandgaps.

3. The waveguide according to claim 2, wherein the first and second structures form p-periodic gratings such that:

$$L_{i+p} = L_i; \text{ et } \Lambda_p = \sum_{j=0}^{p-1} L_{i+j}$$

where $L_i$ is a dimension of an i-th elementary structure along the propagation direction.

4. The waveguide according to claim 3, wherein the first and second structures form bi-periodic gratings such that $L_{i+2} = L_i$; and $\Lambda_2 = L_A + L_B$.

5. The waveguide according to claim 4, wherein the first and second structures form bi-periodic gratings such that $\Lambda_2 < \lambda/n_{eff}$.

6. The waveguide according to claim 1, wherein each dielectric layer has:
a relative permittivity, $\epsilon_r$, and
a length, $l_0$, along the propagation direction,
and wherein each dielectric layer is configured so that $$\frac{\epsilon_r}{l_o} \geq C_s/\epsilon_0,$$

where $C_s$ is a predetermined value representative of a surface capacitance, and $\epsilon_0$ is permittivity of vacuum.

7. The waveguide according to claim 6, wherein the length along the propagation direction of the dielectric layer of each first structure and each second structure is in the range of 5 nm to 50 nm.

8. The waveguide according to claim 1, wherein the dielectric layer of each first and second structure is configured so that a ratio between a thickness of the dielectric layer and a length along the propagation direction is in the range of 6-60.

9. The waveguide according to claim 1, wherein the dielectric layer of each first and second structure is comprised of a material selected from the group consisting of $SiO_2$, $Si_3N_4$, and $HfO_2$.

10. The waveguide according to claim 1, wherein the semiconductor regions are monocrystalline.

11. The waveguide according to claim 1, wherein the semiconductor regions have a doping level of the first conductivity type and of the second conductivity type in the range from $10^{16}$ cm$^{-3}$ to $10^{19}$ cm$^{-3}$.

12. The waveguide according to claim 1, wherein each semiconductor region has a cross-section transversal to the propagation direction, the cross-section defining a base provided with a raised portion.

13. The waveguide according to claim 1, wherein the propagation direction of the electromagnetic wave is curvilinear, and wherein $L_A$ and $L_B$ are curvilinear abscissas calculated from a central area of the waveguide.

14. A capacitive electro-optic modulator comprising the waveguide according to claim 1.

15. The waveguide according to claim 1, wherein the first layer is in direct contact with the first and second structures and with the assembly of dielectric layers.

16. The waveguide according to claim 1, comprising a second layer in direct contact with the grating of structures, said second layer being offset from the propagation direction of the electromagnetic wave and separated from the first layer by the grating, the second layer having a real part $n_{env}$ of an effective index such that $k_0/k<1/n_{env}$.

17. The waveguide according to claim 16, wherein the second layer is in direct contact with the first and second structures and with the assembly of dielectric layers.

18. A waveguide for a capacitive electro-optic modulator, the waveguide comprising:
- at least one light source emitting an electromagnetic wave along a propagation direction, the electromagnetic wave having a wavelength noted A;
- a substrate;
- an assembly of semiconductor regions consecutively extending on the substrate along the propagation direction of the electromagnetic wave, the semiconductor regions being electrically alternately doped with a first conductivity type and with a second conductivity type along the propagation direction;
- an assembly of dielectric layers, each dielectric layer being formed between two consecutive semiconductor regions; the assembly of semiconductor regions and the assembly of dielectric layers forming a grating of structures consecutively comprising a first structure formed by a semiconductor region of the first conductivity type and an adjacent dielectric layer, and a second structure formed by a semiconductor region of the second conductivity type and an adjacent dielectric layer; the first and second structures respectively having first and second dimensions $L_A$, $L_B$ along the propagation direction, the grating being configured to propagate optical modes of the electromagnetic wave having a wave number k in the grating;
- a layer in direct contact with the grating of first and second structures, said layer being offset from the propagation direction of the electromagnetic wave, the layer having a real part $n_{env}$ of an effective index such that $k_0/k<1/n_{env}$, with $k_0$ is a wave number of the electromagnetic wave propagating in vacuum.

* * * * *